United States Patent [19]

Oharek

[11] 4,139,258
[45] Feb. 13, 1979

[54] LASER SCAN CONVERTER

[75] Inventor: Frank J. Oharek, Orlando, Fla.

[73] Assignee: The United States of America as represented by the Secretary of the Navy, Washington, D.C.

[21] Appl. No.: 893,545

[22] Filed: Apr. 5, 1978

[51] Int. Cl.² .......................................... G02B 27/17
[52] U.S. Cl. ...................................... 350/6.8; 346/108
[58] Field of Search ................... 350/6.8, 6.5, 6.6, 6.7, 350/6.91, 285, 6.9; 250/236; 358/206, 208, 293; 346/108

[56] References Cited

U.S. PATENT DOCUMENTS

| | | | |
|---|---|---|---|
| 3,495,036 | 2/1970 | Clayton | 358/206 |
| 3,974,506 | 8/1976 | Starkweather | 358/293 |
| 4,063,287 | 12/1977 | Van Rosmalen | 350/6.6 |
| 4,070,089 | 1/1978 | Grafton | 350/6.8 |

Primary Examiner—Jon W. Henry
Attorney, Agent, or Firm—Richard S. Sciascia; Don D. Doty

[57] ABSTRACT

A laser scan converter is disclosed which converts the scan of a laser light beam in one plane—say, a horizontal plane—into a scan thereof in another plane—say, a vertical plane. The invention comprises a rotating multi-faceted mirror which, as it rotates, intercepts in a first plane a laser light beam that optionally has passed through a semi-mirror and reflectively scans it back to the reflective surface of said semi-mirror which re-reflects and redirects it to a full mirror which, in turn, re-re-reflects and re-redirects it to a predetermined surface of a utilization apparatus, the surface of which is located in a second plane that is different from the aforesaid first plane—say, one that is perpendicular thereto.

24 Claims, 1 Drawing Figure

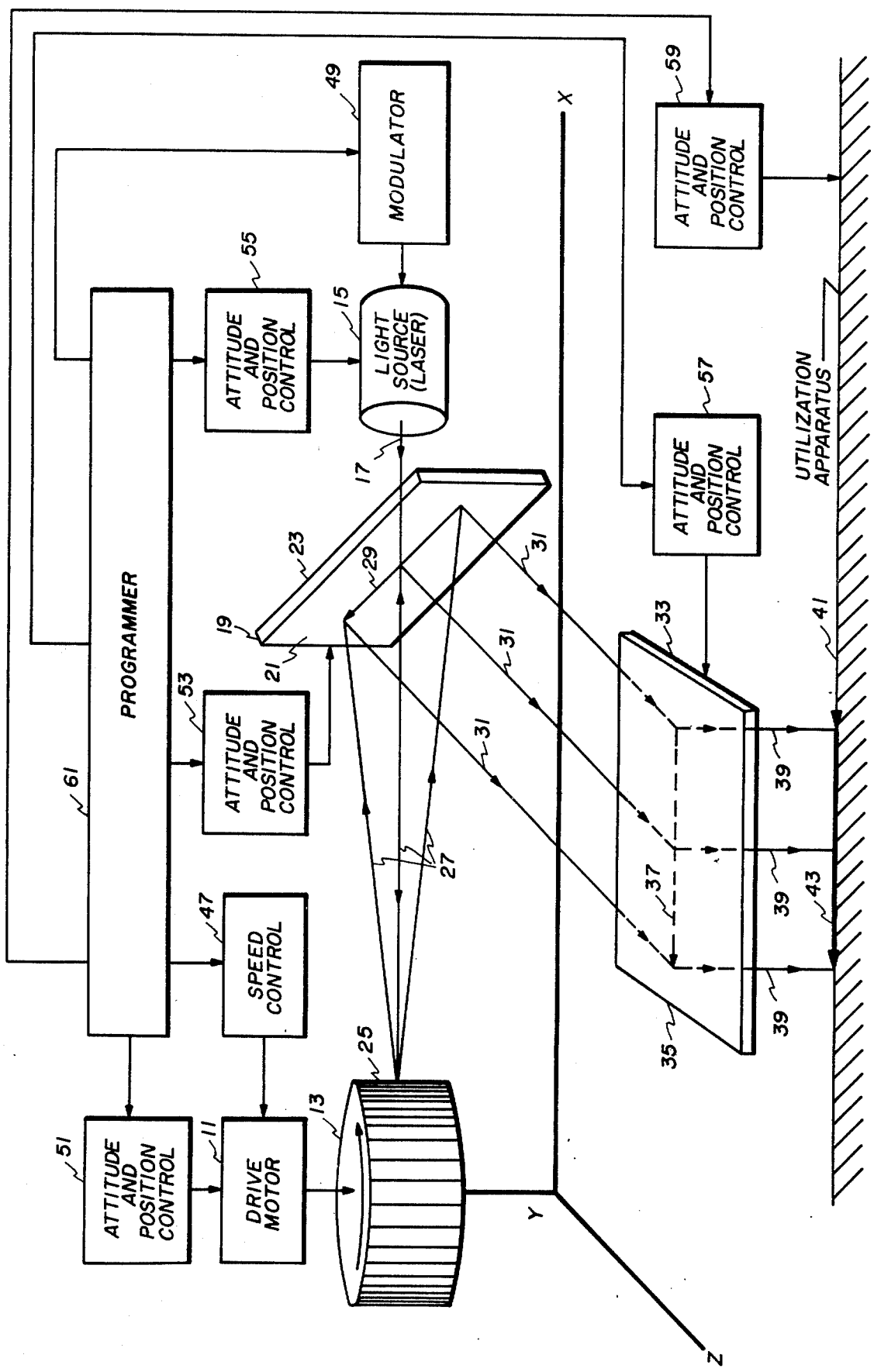

LASER SCAN CONVERTER

FIELD OF THE INVENTION

The present invention, in general, relates to optical systems and, in particular, is an optical scan converter for scanning an object in one angular direction and for reading it out at another angular direction. In even greater particularity, the subject invention is a simplified, highly accurate method and means for converting a laser light scan in one plane—say, for example, in a horizontal plane—to a scan thereof in another plane—say, for example, in a vertical plane—in accordance with a predetermined program.

DESCRIPTION OF THE PRIOR ART

Heretofore, several optical scan systems have been available which usually work quite satisfactorily for their intended purpose. Such scan systems, for instance, might include angular scan converters that incorporate wobble plate-like mirrors, and the like.

Moreover, U.S. Pat. No. 4,005,926 to Neale et al. for Scanning Device, issued Feb. 1, 1977, appears to disclose prior art of somewhat similar but not identical nature to that of the invention. Said patent ostensibly discloses a method and means for scanning a path on a surface by use of parallel beams of radiant energy, whereby at least one path is scanned across at least one surface as a consequence of directing at least two parallel beams of radiant energy in such manner as to strike individually a like number of faces of a rotating mirrir polygon as there are beams of radiant energy, thereby deflecting the reflected paths of said beams through angles equal to twice the angular subtense of each polygon face at the polygon center, with said parallel beams of radiant energy, after reflection from the faces of the mirror polygon, falling on at least one surface.

In addition, U.S. Pat. No. 4,003,627 to Wu et al., for Point of Sale Optical Scanning Station With Slotted Planar Plate, issued Jan. 18, 1977, ostensively discloses an optical scanning station which includes means for generating a predetermined scanning pattern along a given plane and a member embodying said scanning pattern in the form of open slots that are substantially coincident with said given plane.

Further, U.S. Pat. No. 3,718,761 to Myer for Omnidirectional Planar Optical Code Reader, Issued Feb. 27, 1973, seems to portray an optical system for reading graphic codes, regardless of their orientation in a plane, which includes apparatus for generating a scan of a shaped light beam and rotating said scan on and across targets having a code for transmission thereof to a detector. Alternatively, the code of the target may be included within the beam which is scanned across and rotated on the detector, thereby enabling the reading thereof thereby.

SUMMARY OF THE INVENTION

The instant invention is not only different from and simpler than the aforementioned prior art, it produces some results which are different, too. For its intended purpose, it appears to constitute an improvement over said prior art, although the aforesaid prior art devices, too, are undoubtedly satisfactory and quite useful for their intended purposes, respectively. The invention comprises a laser scan converter in which a rotating multi-faceted mirror intercepts a laser light or beam and scans it across another mirror disposed in such manner as to pass it to a second mirror which, in turn, reflects it as another scan of said laser light across an object or surface. Although only one such scanning system is disclosed herewith in detail, multiples of the laser and mirror combination may be positioned around the same rotating multi-faceted mirror to provide a predetermined plurality of such scans in multiple directions, thereby requiring only one moving part—viz., the rotating multi-faceted mirror—to achieve any or all of the scans. Thus, in many respects it is different from the above mentioned prior art and overcomes some of the disadvantages thereof.

For example Neale et al., as previously suggested, provides a scanning device that permits the scan of an object in two areas with the use of a single laser. The arrangement of the rotating multi-faceted mirror and the redirecting mirrors are, to some extent, similar to the subject invention, with the exception that the laser is not directed through a half mirror toward the axis of the rotating mirror; neither is it directly aimed thereat, thereby requiring additional optical elements not required by the instant invention.

Wu et al., as previously suggested, ostensively provides a simultaneous scan of an object by use of a single laser with a beam splitter and use of a rotating multi-faceted mirror and a set of redirecting mirrors, thereby again containing optical elements not included in the subject invention.

Myer provides, as likewise previously suggested, a device which converts a wide beam of light striking a rotating multi-faceted mirror, so as to effect a multi-directional scan by means of an additional set of rotating mirrors accomplishing a multi-directional wide beam scan of an object. It, too, requires optical elements not required by the present invention, in order for it to operate for its intended purpose.

In view of the foregoing, it should be readily apparent to the artisan that there may be some individual component similarities between the aforesaid prior art and the instant invention, but that there are also considerable differences therebetween, as well, in that the present invention contains a new, unique, and simpler combination of elements not specifically found in any thereof. Accordingly, in view of its simplicity, its usefulness, its different and unobvious structure, the invention is deemed to advance the state of the art to a patentable extent, taking into consideration 35 U.S.C. 103.

Therefore, an important object of the invention is to provide an improved optical scanning system.

Another object of this invention is to provide an improved laser scan converter.

Still another object of this invention is to provide an improved, simplified method and means for converting a horizontal laser scan to a vertical laser scan.

A further object of this invention is to provide a scan converter which may scan an object in one angular direction and read it out in another angular direction.

Another object of this invention is to provide a highly accurate, simplified, unique method and means for converting a laser or other light scan in one plane to a scan thereof in another plane in accordance with a predetermined program.

Still another object of this invention is to provide an improved scan converter that may incorporate no moving linkages, wobble plates, or the like, and, if desired, need contain only one moving part.

Another object of this invention is to provide an optical scan converter that is simple and is easily and economically manufactured, used, maintained, and deployed, relative to those of the prior art.

Other objects, advantages and novel features of the invention will become apparent from the following detailed description of the invention when considered in conjunction with the accompanying drawing wherein:

BRIEF DESCRIPTION OF THE DRAWING

FIG. 1, the sole FIGURE of the drawing, is a combination schematic, quasi-pictorial, block diagram of the laser scan converter constituting the invention.

DESCRIPTION OF THE PREFERRED EMBODIMENT

At the outset, it would perhaps be noteworthy that each and every one of the individual components of the subject invention is conventional, well known, and commercially available. Hence, as previously indicated, it is their new, unique, and unobvious combination which effects the subject invention and causes its new and unique results implied by the above stated objectives.

Referring now to FIG. 1, there is shown a drive motor 11 which is connected to a rotatable, disk-like, multi-faceted, concentric mirror 13 for the driving thereof in whatever direction scanning is desired, say, in this particular case, in the counterclockwise direction when viewed from above.

In this particular instance, concentric multi-faceted mirror 13 rotates about a "Y" axis, with the plane thereof located in some plane that is parallel to another plane that includes the "X" and "Z" axes of X, Y, and Z coordinate axes, the reference axes employed to facilitate this discussion.

As shown, each mirror face of concentric mirror 13 is preferably flat and scans—that is, receives and scanningly reflects—the light from a predetermined radiant energy or light source 15 spatially disposed therefrom. Of course, the surfaces of the mirror making up multi-faceted mirror 13 could be curved and, thus, have any useful configuration, such as, for instance, a flower petal configuration, in the event non-linear scanning is desired. Said light source 15 may, of course, be any type which makes it compatible with the intended use of the invention; thus, for example, it may be an ordinary incadescent lamp, or it may be a collimated or coherent light source having any particular radiation frequency or frequencies, such as a laser or the like. For the purpose of keeping this disclosure as simple as possible, light source 15 will be considered as being a laser which produces and projects any given frequency laser light beam 17 to and through a flat, planar, semi-mirror 19—having a semi-mirrored side 21 and a non-mirrored side 23—toward the mirror faces 25 of rotatable concentric mirror 13. As projected from laser 15, beam 17, of course, passes through semi-mirror 19 from non-mirrored side 23 to semi-mirrored side 21 and then is directed on to multi-faceted mirror 13. Upon reaching the semi-mirrored or reflecting side 21 of the aforesaid semi-mirror 19, said amplified scan line 29 (represented, in this case, by an arrow configuration to portray direction of scan) is re-reflected therefrom and, thus, is redirected in accordance with the attitude and position thereof. As may be seen in FIG. 1, semi-mirror 19 is positioned at substantially 45° with an imaginary plane passing through the "X" and "Z" axes. Hence, scanning radiant energy reflection 31 of amplified scan line 29 impacts on the underside 33—that is, the mirrored side—of a full mirror 35 as radiant energy scan line 37, which, in turn, re-re-reflects it as reflection 39, so as to be received by some predetermined surface 41 as radiant energy scan line 43, with said surface 41 being any suitable and compatible apparatus used in or in conjunction or combination with the invention—say, for instance a projection screen, or the like.

In this particular case, since multi-faceted mirror 13 has been defined as rotating counterclockwise when viewed from the top, scan line 37 is a laser light line that has, in fact, been scanned from right to left, like the aforementioned laser light scan line line 29. Of course, it should be obvious to the artisan by this time that scan lines 29, 37, and 43 have actually been effected as a result of the scanning movement of a light spot produced by the projection of laser light beam 17 from laser light source 15 and the rotation of any given flat mirror face of the aforesaid mirror 13.

In addition to the foregoing optical portion of the invention, other structural elements may be included therein; hence, a conventional speed control 47 may be optionally and appropriately connected to drive motor 11 for the controlling of driving speed thereof. Likewise, a conventional light source modulator 49 may be optionally connected to light source 15; and, of course, if light source 15 is a laser, modulator 49 would then be a laser modulator.

Obviously, all of the elements mentioned above are combined—respectively but, as warranted, interactively—with mounting and support structures not specifically disclosed herein, in order to keep the disclosure of this invention as simple as possible. And, furthermore, in respective combinations therewith, a number of attitude and position controls may be employed to provide the proper disposition of all of the elements of the invention for any given operational situation. Consequently, attitude and position controls 51, 53, 55, 57, and 59 may optionally be connected to drive motor 11 (or drive motor 11 and rotatable mirror 13 combination), semi-mirror 19, light source 15, mirror 33, and utilization apparatus surface 41, respectively. Moreover, in the event the artisan desires to change the dispositions and/or operating conditions of any or all thereof, any suitable programmer 61 for so doing may optionally be connected to the aforesaid speed control 47, modulator 49, and attitude and position controls 51, 53, 55, 57, and 59.

Obviously, it would be well within the purview of one skilled in the art having the benefit of the teachings presented herewith to structurally combine and dispose all of the aforementioned elements of the invention in such manner as to cause it to accomplish any or all of the above stated objectives, and perhaps others as well. Accordingly, the proper interactions thereof will have been implemented for such purposes during any given operational circumstances.

MODE OF OPERATION

The operation of the invention will now be discussed briefly in conjunction with the sole FIGURE of the drawing.

In this particular embodiment, laser 15 shoots laser light beam 17 through semi-mirror 19 to multi-faceted concentric mirror 13, where it is received by each mirror face thereof successively as it rotates about its axis of rotation—say, axis "Y" in this instance. Now, if mirror 13 were not rotating, one of the mirror faces—say, face 25—thereof would receive laser beam 17 as a spot—herewith referenced as reflected spot 27—and said spot would be reflected thereby in accordance with angle thereof with respect to the direction of the incoming laser beam. But, since mirror 13 is normally rotating, each mirror face thereof reflects laser beam 17 for a certain period of time while that particular face is in position for reception thereof. And inasmuch as the relative angle therebetween changes as a result of the rotation of concentric mirror 13, said spot of laser light is effectively scanned and swept across semi-mirrored surface 21 of semi-mirror 19 in a linear manner, thereby traveling a course thereon represented by arrow 29.

As line 29 is being traversed by said moving spot 27, spot 27 is being again reflected as reflected laser light spot 31 by semi-mirror 19 along dashed line 37, from which it is, in turn, reflected by the under mirror side of mirror 35, so as to be projected as moving laser light 39 along path 43 on utilization apparatus surface 41. Thus, it may readily be seen that moving spot 39 traces or scans line 43 in the direction of the arrow thereof in successive predetermined periods of time without the occurrence of any retrace thereof. Of course, the length of scanned line 43 is contingent upon several design parameters, viz: the size of concentric mirror 13, the number of faces thereof, and the speed of rotation thereof. And, moreover, in view of the foregoing, it would perhaps be noteworthy that when laser beam 17 is incident on mirror 13, it is scanned twice the angular subtense of the mirror facets "n" times per revolution thereof, where "n", in this particular situation, is the number of mirror facets thereon, even though the original scan was tangent to the direction of rotation of said mirror 13 and to the annular image being scanned.

The aforementioned two mirror arrangement can convert the aforesaid tangential scan to a radian scan. For example, if mirror 19 is 45° as previously suggested, it rotates the direction of scan 90° in the plane of rotation; and then mirror 35 directs the beam reflected from mirror 19, so that it is normal to the rotational axis of mirror 35, thereby providing a radial scan and accomplishing the desired scan conversion. Consequently, horizontal (or some other first plane) scanning is converted to vertical (or some other second plane) scanning, depending on the relative dispositions of mirror 13, semi-mirror 19, and mirror 35.

Without violating the spirit and scope of this invention, several design choices of the artisan are possible. For instance, suitably designed prisms may be substituted for mirrors 19 and 35; if so desired, light source 15 may be any of many laser or other light sources, and it may, under certain circumstances, be physically disposed in such manner that its beam 17 directly impacts on the facets of rotating mirror 13 without going through semi-mirror 19; a redirecting mirror or prism arrangement between rotating mirror 13 and light source 15 may be used to facilitate the physical disposition of either or both thereof with respect to the other elements of the invention and/or other components associated therewith and still cause beam 17 to impact on rotating mirror 13 during the scanning rotation thereof; and the angles of arrangement of any or all of the mirrors may be changed to provide patterns of scan lines other than radial or linear as shown, thereby making it possible to cover different image formats.

In order to implement the foregoing alternative arrangements of the elements uniquely combined in this invention, speed control 47 has been provided for properly adjusting the shaft speed of drive motor 11, attitude and position controls 51, 53, 55, 57, and 59 have been provided to, as desired, adjust their respective mirror and other elements, and modulator 49 has been provided for effecting the modulation of the laser or other light beam from light source 15, with any or all thereof being employed on an optional basis. In addition, programmer 61 has, likewise, been included in the subject invention on an optional basis, in the event it is desired to adjust any or all of the aforesaid elements in accordance with some predetermined program that will optimize the performance of the invention for some particular purpose.

Because of the simple but efficient operation of the scan converter disclosed herewith and discussed above, it becomes possible to use a plurality of the aforementioned mirror arrangements in combination with a single multi-faceted mirror to effect the scanning and scan conversion of a number of light images that are arranged thereabout on various and sundry angular sectors of a screen of predetermined angular or circular geometrical configuration. And if the number n of the mirror facets of rotating mirror 13 were selected to have twice the number of the mirror faces as there are screen sectors, the scan angles will never overlap, thereby preventing the necessity of using a much larger multi-faceted, revolving mirror to stagger the optical channels, say, in the vertical direction. As a result, circular screens may be used as utilization apparatus surface 41, upon which practically unlimited modulated laser light images may be effectively projected with considerable optical fidelity. Of course, the composite of said images may, depending on the modulation of all of the light sources employed, form simulated ambient environmental or other scenes, as desired or as programmed in programmer 61.

In view of the foregoing, it may readily be seen that the subject invention is unique and exceedingly useful for converting a laser or other light scan in one plane—say, for instance, in a horizontal plane—to a scan thereof in another plane—say, for instance, in a vertical plane—and, thus, produce pictures or other images in accordance with a predetermined program, which makes it an exceedingly valuable invention, indeed.

Obviously, many modifications and variations of the present invention are possible in light of the above teachings. It is, therefore, to be understood that within the scope of the appended claims the invention may be practiced otherwise than as specifically described.

What is claimed is:

1. A scan converter, comprising in combination:
   means having at least one radiant energy reflecting surface adapted for being rotated about an axis;
   means having a radiant energy semi-reflecting surface spatially disposed along a first optical path from said at least one radiant energy reflecting surface means for timely re-reflecting the radiant energy received therefrom;
   means having a radiant energy reflecting surface spatially disposed along a second optical path from said radiant energy semi-reflecting surface means for re-reflecting the radiant energy received therefrom; and
   means spatially disposed from said at least one radiant energy reflecting surface for projecting a predetermined radiant energy through said radiant energy semi-reflective surface means directly to and from said at least one radiant energy reflecting surface means along said first optical path and on to said radiant energy reflective surface means along said second optical path as said at least one radiant energy reflecting surface means is being rotated about the aforesaid axis.

2. The device of claim 1, wherein said means having at least one radiant energy reflecting surface adapted for being rotated about an axis comprises a multi-faceted mirror.

3. The device of claim 1, wherein said means having at least one radiant energy reflecting surface adapted for being rotated about an axis comprises a multi-faceted mirror having a predetermined plurality of mirror faces, each face of which is flat, has a predetermined geometrical configuration, is disposed substantially equidistant from a predetermined center that is located on the aforesaid axis, and is in contiguous disposition with adjacent ones thereof.

4. The device of claim 1, wherein said means having a radiant energy semi-reflecting surface disposed along a second optical parth from said at least one radiant energy reflecting surface means for timely re-reflecting the radiant energy received threfrom comprises a semi-mirror.

5. The device of claim 1, wherein said means having a radiant energy reflecting surface disposed along a second optical path from said radiant energy semi-reflecting surface means for re-reflecting the radiant energy received therefrom comprises a full mirror.

6. The device of claim 1, wherein said means spatially disposed from said at least one radiant energy reflecting surface for projecting a predetermined radiant energy thereto as said at least one radiant energy reflecting surface means is being rotated about the aforesaid axis comprises a laser, with the radiant energy projected therefrom being a laser light beam.

7. The device of claim 1, further characterized by means effectively connected to said at least one radiant energy reflecting surface means, said radiant energy semi-reflecting surface means, said radiant energy reflecting surface means, and said predetermined radiant energy projecting means for the respective controlling thereof in predetermined manners in accordance with respective predetermined programs.

8. A scan converter, comprising in combination:
   a rotatable multi-faceted mirror means adapted for being rotated about an axis that is perpendicular to a predetermined first plane;
   first mirror means spatially disposed along a first optical path from said rotatable mirror means in such manner as to receive and reflect radiant energy therefrom, said fist mirror means having a first predetermined angular disposition with respect to the aforesaid first plane;
   second mirror means spatially disposed along a second optical path from said first mirror means in such manner as to receive and re-reflect the radiant energy received thereby and reflected therefrom, said second mirror means having such second predetermined angular disposition with respect to the aforesaid first plane and said first mirror means that the radiant energy re-reflected thereby is directed along a third optical path to a second plane having a predetermined angular relationship with the aforesaid first plane; and
   means spatially disposed from said rotatable multi-faceted mirror means for projecting a predetermined radiant energy through said first mirror means directly to and from said rotatable multi-faceted mirror means along said first optical path and on to said second mirror means along said second optical path.

9. The device of claim 8, wherein said rotatable multi-faceted mirror means adapted for being rotated about an axis that is perpendicular to a predetermined first plane comprises a circularly configured disk having a predetermined plurality of flat mirrors mounted on the circumferential periphery thereof.

10. The device of claim 8, wherein said first mirror means spatially disposed along a first optical path from said rotatable mirror means in such manner as to receive and reflect radiant energy therefrom comprises a flat planar semi-mirror.

11. The device of claim 8, wherein said second mirror means spatially disposed along a second optical path from said first mirror means in such manner as to receive and reflect the radiant energy received thereby and reflected therefrom comprises a flat planar full mirror.

12. The device of claim 8, wherein said means spatially disposed from said rotatable multi-faceted mirror means for projecting a predetermined radiant energy through said first mirror means toward said rotatable multi-faceted mirror means in such manner as to be reflected back along the aforesaid first optical path to said first mirror means by each of the mirror faces thereof when said rotatable multi-faceted mirror means is rotated about the aforesaid axis comprises a light source.

13. The device of claim 8, wherein said means spatially disposed from said rotatable multi-faceted mirror means for projecting a predetermined radiant energy through said first mirror means toward said rotatable multi-faceted mirror means in such manner as to be reflected back along the aforesaid first optical path to said first mirror means by each of the mirror faces thereof when said rotatable multi-faceted mirror means is rotated about the aforesaid axis comprises a collimated light source.

14. The device of claim 8, wherein said means spatially disposed from said rotatable multi-faceted mirror means for projecting a predetermined radiant energy through said first mirror means toward said rotatable multi-faceted mirror means in such manner as to be reflected back along the aforesaid first optical path to said first mirror means by each of the mirror faces thereof when said rotatable multi-faceted mirror means is rotated about the aforesaid axis comprises a laser.

15. The invention of claim 8, further characterized by a motor connected to said rotatable multi-faceted mirror means for the rotational driving thereof.

16. The invention of claim 8, further characterized by:
   a drive motor connected to said rotatable multi-faceted mirror means for the rotational driving thereof; and
   means effectively connected to said drive motor for controlling the speed thereof.

17. The invention of claim 8, further characterized by a modulator connected to said predetermined radiant energy projecting means for modulating the radiant energy projected thereby.

18. The invention of claim 8, further characterized by means effectively connected to said predetermined radiant energy projecting means for effecting the modulation of the predetermined radiant energy projected thereby in accordance with a predetermined program.

19. The invention of claim 8, further characterized by means spatially dispoed along said third optical path from said second mirror means for receiving and reflecting said re-reflected radiant energy as an optical image located in at least a portion of said second plane.

20. The device of claim 19, wherein said means spatially disposed along said third optical path from said second mirror means for receiving and reflecting said re-reflected radiant energy as an optical image located in at least a portion of said second plane comprises a projection screen.

21. An optical scan converter comprising in combination:
- a rotatable multiple-faceted mirror adapted for being rotated about an axis that is perpendicular to a predetermined first plane, said rotatable multi-faceted mirror having a predetermined plurality of mirror faces, each mirror face of which is flat, each mirror face of which has a predetermined geometrical configuration, each mirror face of which is substantially equidistant from and faces outwardly from a predetermined center located on the aforesaid axis, and each mirror face of which is positioned in contiguous disposition with the adjacent ones thereof;
- a semi-mirror disposed along a first optical path from said rotatable multi-faceted mirror in such manner as to receive and reflect radiant energy therefrom at a first predetermined angle with respect thereto and a first plane;
- a full mirror spatially disposed along a second optical path from said semi-mirror in such manner as to receive and re-reflect the radiant energy received thereby at a second predetermined angle with respect thereto and said first plane along a third optical path to a second plane having a predetermined angular disposition with respect to said first plane;
- a laser spatially disposed from said rotatable multi-faceted mirror for projecting a predetermined radiant energy through said semi-mirror towards said rotatable multi-faceted mirror in such manner as to be reflected back along the aforesaid first optical path to said semi-mirror by each of the mirror faces thereof when said rotatable multi-faceted mirror is rotated about the aforesaid axis;
- a drive motor connected to said rotatable multi-faceted mirror for the rotational driving thereof;
- a modulator connected to said laser for effecting the modulation of the laser light beam projected therefrom;
- a speed control connected to the aforesaid drive motor for controlling the shaft speed thereof;
- a first attitude and position control connected to said drive motor;
- a second attitude and position control connected to said semi-mirror;
- a third attitude and position control connected to said laser; and
- a fourth attitude and position control connected to said full mirror.

22. The invention of claim 21, further characterized by a predetermined energy radiation reflective screen spatially disposed from said full mirror at a predetermined angle with respect to said first plane and in such manner as to receive the radiant energy re-reflected by said full mirror.

23. The invention of claim 21, further characterized by:
- a second surface adapted for reflecting the light beam projected by the aforesaid laser, said second plane having a predetermined angular disposition with respect to said first plane; and
- a fifth attitude and position control effectively connected to said second surface for adjusting the attitude and position thereof.

24. The invention of claim 23, further characterized by a programmer connected to the aforesaid speed control, said modulator, and said first through fifth attitude and position controls for effecting the respective control thereof in accordance with predetermined respective programs.

* * * * *